United States Patent [19]
Clifton et al.

[11] Patent Number: 5,599,129
[45] Date of Patent: Feb. 4, 1997

[54] LOAD LIMITED CONNECTOR

[75] Inventors: David G. Clifton, Delta; Heiko Epkens, Vancouver, both of Canada

[73] Assignee: DCD Design & Manufacturing Ltd., Vancouver, Canada

[21] Appl. No.: 373,759

[22] Filed: Jan. 17, 1995

[51] Int. Cl.⁶ ........................................................ F16P 5/00
[52] U.S. Cl. ........................... 403/2; 403/79; 403/164
[58] Field of Search ........................... 116/200, 212, 116/DIG. 34; 294/82.24; 403/2, 41, 78, 79, 164

[56] References Cited

U.S. PATENT DOCUMENTS

| | | | |
|---|---|---|---|
| 1,610,414 | 12/1926 | Bernard et al. | 403/2 X |
| 2,387,599 | 10/1945 | Miller et al. | 287/91 |
| 2,429,929 | 10/1947 | Fisher | 255/25 |
| 2,480,662 | 8/1949 | McKinzie | 42/85 |
| 2,633,375 | 3/1953 | Wilcoxon | 287/91 |
| 2,889,162 | 6/1959 | Norris | 403/2 |
| 3,185,413 | 5/1965 | Walker | 403/2 X |
| 3,490,799 | 1/1970 | Shreeve | 287/91 |
| 3,922,104 | 11/1975 | McCullough | 403/2 |
| 3,960,456 | 6/1976 | Norris | 403/27 |
| 3,977,213 | 8/1976 | Spencer et al. | 403/2 X |
| 3,982,847 | 9/1976 | Kawase et al. | 415/9 |
| 4,308,419 | 12/1981 | Fredriksson | 174/185 |
| 4,330,926 | 5/1982 | McCall | 29/526 |
| 4,687,365 | 8/1987 | Promersberger | 403/2 |
| 5,122,007 | 6/1992 | Smith | 403/2 |

*Primary Examiner*—Brian K. Green
*Assistant Examiner*—Andrea Chop
*Attorney, Agent, or Firm*—Kvas Miller Everitt

[57] ABSTRACT

A load limited connector that is calibrated to fail at a predetermined approximate tensile load. The connector includes a main body, within which a pin chamber is received, and a secondary body having a shaft that is releasably secured within the pin chamber. At least one breakaway pin, positioned in a pin passageway passing through the pin chamber and into the main body, secures the pin chamber within the main body. When the connector is subjected to tensile loading that exceeds the yielding point of the breakaway pin, failure of the pin occurs resulting in separation of the main body from the secondary body. A pair of torsion pins extend through the pin chamber into the main body to prevent rotation of the pin chamber relative to the main body.

13 Claims, 3 Drawing Sheets

LOAD LIMITED CONNECTOR

THE FIELD OF THE INVENTION

This invention relates to connectors of the type having an internal load limiting mechanism causing the connector to fail at a predetermined approximate tensile load. In particular, the invention relates to load limiting connectors for use in directional drilling or other applications where it is necessary or desirable to initiate failure in the connector when subjected to a predetermined tensile load.

BACKGROUND OF THE INVENTION

The installation of underground ducting and cabling is commonly accomplished through underground boring and pulling methods. In these methods, a pilot hole is typically drilled through the underground structure where the cable or duct is to be run. Once the pilot hole is completed, a drill steel is inserted back through the hole and a cutting head attached to the drill steel. The drill steel is then connected to a boring machine which rotates the cutter and pulls it back through the pilot hole thereby enlarging the hole to the required diameter. Alternately, pneumatic or hydraulic motors on the cutter may be used for rotational movement.

Typically a cable or duct is connected to the rear of the cutting head such that as the cutting head is pulled back through the pilot hole, not only is the pilot hole enlarged to the desired diameter but the cable or duct is pulled through simultaneously. Since the cutting head is rotating as the cable or duct is pulled through the freshly cut hole, a swivel is used between the cutter and the cable or duct to prevent rotation of the cable or duct. This method of both drilling a hole and installing a cable or duct simultaneously is often referred to as directional drilling. In some situations a two step process may be used where a hole is first drilled following which a cable or duct is pulled through.

Unfortunately, regardless of which of these methods are used, it is not possible to view the cable or duct as it is being pulled through the underground hole. It will be appreciated that the cable or ducting that is installed will have a maximum tensile load to which it may be subjected without causing structural damage. Accordingly, methods have been devised to monitor the tensile load applied to cables or ducts in such applications. Others have suggested monitoring the pulling force applied to the drill steel or fish line such that the load does not exceed the maximum safe tensile load of the cable or ducting being installed. While such methods may be somewhat useful when pulling a cable or conduit through a pre-existing hole, their use is severely limited where directional drilling is used. In cases where a cable or ducting is attached by way of a swivel to the back of a cutter head, the pulling force that must be applied to the cutter in most cases exceeds the maximum allowable tensile load for the cable or ducting. Monitoring the pulling force is therefore of little or no benefit.

Still others have proposed attaching folded over loops of wire, with a known breaking value, to the cable or ducting. When the looped wire breaks, the operator of the machinery knows that the load has been exceeded. For example, if looped wires having a breaking value of 500 pounds are to be used and it is decided that a safe maximum tensile load for the application is 1500 pounds, three looped wires would be used on the assumption that they would fail at or about 1500 pounds of tensile force. Obviously, this method of monitoring the load applied to a cable or ducting is fraught with problems, including difficulty of set up, overall time consumption, and the inability to accurately monitor precise loads and to duplicate pulls under various working conditions.

SUMMARY OF THE INVENTION

The invention therefore provides a load limited connector which overcomes the short comings of the prior devices and methods through the incorporation of a structure which is designed and calibrated to fail at a predetermined approximate tensile load. The invention also provides a load limited connector that may be calibrated to fail at different predetermined approximate tensile loads so that it may be used in a variety of different applications.

Accordingly, in one of its aspects the invention provides a load limited connector, calibrated to fail at a predetermined approximate tensile load, the connector comprising: a main body having first and second ends, said first end including first attachment means and said second end including a central bore; a pin chamber constructed to be received in said central bore of said main body, said pin chamber having a central bore extending partially therethrough and at least one passageway therethrough which aligns with at least one longitudinal passageway in said main body, said passageway in said pin chamber and said longitudinal passageway in said main body together forming a pin passageway for receiving a breakaway pin; a secondary body having first and second ends, said first end of said secondary body including second attachment means and said second end of said secondary body defining a shaft, said shaft being releasably secured within said central bore of said pin chamber; and, at least one breakaway pin, said breakaway pin received within said pin passageway, said breakaway pin securing said pin chamber within said central bore of said main body and being calibrated to break at a predetermined approximate tensile load causing said main body to separate from said secondary body when said connector is subjected to tensile loading that exceeds said predetermined approximate tensile load.

In another aspect the present invention provides a kit comprising: a load limited connector calibrated to fail at a predetermined approximate tensile load, the connector including a main body having first and second ends, said first end including first attachment means and said second end including a central bore; a pin chamber constructed to be received in said central bore of said main body, said pin chamber having a central bore extending partially therethrough and at least one passageway therethrough which aligns with at least one longitudinal passageway in said main body when said pin chamber is received in said central bore of said main body, said passageway in said pin chamber and said longitudinal passageway in said main body together forming a pin passageway for receiving a breakaway pin; a secondary body having first and second ends, said first end of said secondary body including second attachment means and said second end of said secondary body defining a shaft, said shaft being releasably secured within said central bore of said pin chamber; and, a plurality of breakaway pins, each being receivable within said pin passageways, said breakaway pins when received in said pin passageways securing said pin chamber within said central bore of said main body and being calibrated to break at a predetermined approximate tensile load, thereby causing said main body to separate from said secondary body when said connector is subjected to tensile loading that exceeds said predetermined approximate tensile load.

BRIEF DESCRIPTION OF THE DRAWINGS

For a better understanding of the present invention, and to show more clearly how it may be carried into effect, reference will now be made, by way of example, to the accompanying drawings which show the preferred embodiment of the present invention in which.

DESCRIPTION OF PREFERRED EMBODIMENT

Figure 1:
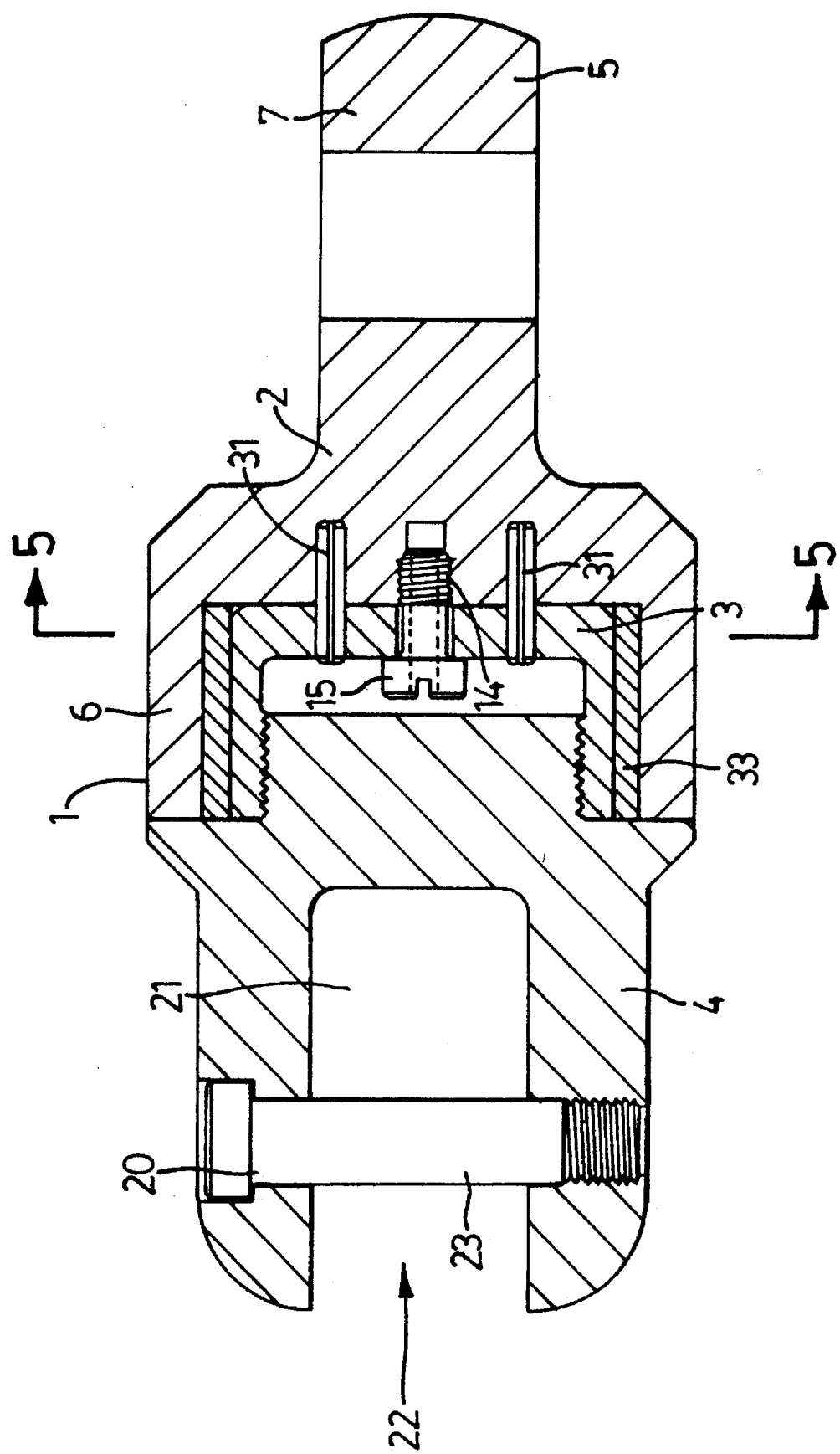
FIG. 1 is a side sectional view of the load limited connector according to the present invention.

Referring to FIG. 1, a load limited connector pursuant to the present invention is noted generally by the numeral 1. The connector 1 comprises primarily a main body 2, a pin chamber 3, and a secondary body 4.

Figure 2:
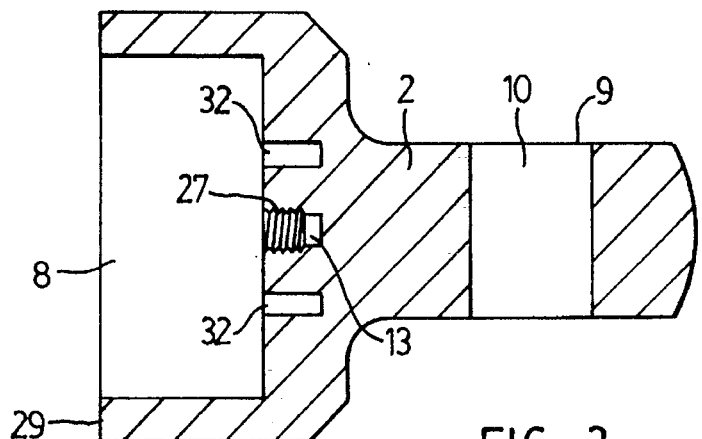
FIG. 2 is a side sectional view of the main body of the load limited connector of FIG. 1.

Referring to FIGS. 1 and 2, main body 2 has first and second ends, 5 and 6 respectively, with first end 5 including first attachment means 7 and second end 6 including a central bore 8. In the preferred embodiment, first attachment means 7 comprises a lug 9 having a central hole 10. Lug 9 would typically be used to attach main body 2, and hence connector 1, to a swivel on the rear of a cutter in a directional drilling application.

Figure 3:
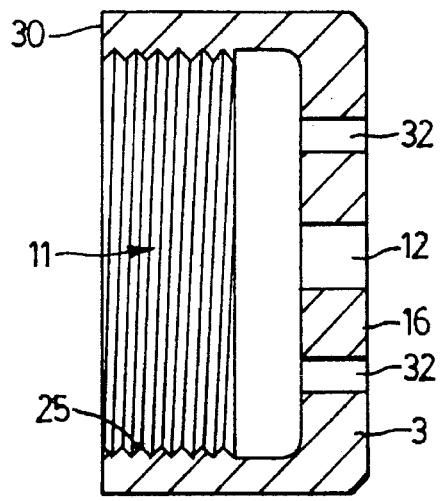
FIG. 3 is a side sectional view of the pin chamber of the load limited connector of FIG. 1.
Figure 4:
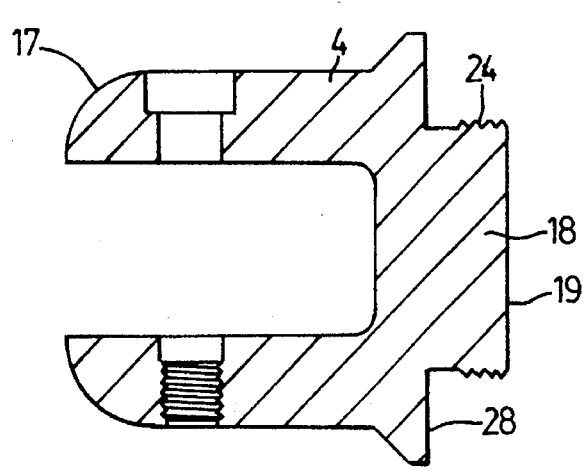
FIG. 4 is a side sectional view of the secondary body of the load limited connector of FIG. 1.

Referring now to FIGS. 1 and 3, pin chamber 3 is shown to be constructed so as to be received within central bore 8 of main body 2. Pin chamber 3 also includes a central bore 11 and at least one passageway 12 through its rear face 16. Pin chamber 3 is received within central bore 8 of main body 2 such that passageways 12 align with longitudinal passageways 13 in main body 2. Passageways 12 and longitudinal passageways 13 together comprise pin passageways 14 for receiving a breakaway pin 15.

Secondary body 4 also has first and second ends, 17 and 18 respectively. First end 17 of secondary body 4 includes second attachment means 20 while second end 18 defines a shaft 19. In the preferred embodiment, second attachment means 20 is a clevis 21 having an internal slot 22 and retaining means 23. Clevis 21 would normally be used to attach connector 1 to a trailing cable or duct in a directional drilling application.

Shaft 19 of secondary body 4 is constructed so as to be releasably secured within central bore 11 of pin chamber 3. In the preferred embodiment, shaft 19 is fitted with external threads 24 which engage corresponding internal threads 25 within central bore 11 of pin chamber 3. Threads 24 and 25 thus allow secondary body 4 to be threaded into, and retained within, pin chamber 3.

In order to secure pin chamber 3 within central bore 8 of main body 2, at least one breakaway pin 15 is releasably secured within one of the pin passageways 14. Breakaway pin 15 is constructed and calibrated to break or fail at a predetermined approximate tensile load causing main body 2 to separate from pin chamber 3 and secondary body 4 when connector 1 is subjected to a tensile load exceeding the yield point of breakaway pin 15.

Breakaway pin 15 is secured within pin passageway 14 by threading it into longitudinal passageway 13 of main body 2. That is, breakaway pin 15 is constructed with threads 26 on its end such that pin 15 may be threaded into corresponding threads 27 cut into longitudinal passageway 13. Accordingly, by inserting breakaway pin 15 through passageway 12 in pin chamber 3, and threading it into longitudinal passageway 13 of main body 2, pin chamber 3 is securely held within central bore 8.

It will be appreciated that to assemble the connector 1, pin chamber 3 must first be inserted into central bore 8 of main body 2. Thereafter, at least one breakaway pin 15 is threaded through pin chamber 3 into longitudinal passageway 13 of main body 2 to releasably secure pin chamber 3 within central bore 8. Shaft 19 on secondary body 4 may then be threaded into central bore 11 of pin chamber 3 thereby holding the connector together.

It is desirable to prevent the unobstructed entry of fluid and debris into pin chamber 3. In these regards, shoulders 28 of secondary body 4 and outer ends 29 and 30 of main body 2 and pin chamber 3, respectively, are machined so that they are relatively smooth and flat thereby providing a "tight" fit between secondary body 4, pin chamber 3 and main body 2 when shaft 19 is threaded into pin chamber 3.

It will also be appreciated that when threading shaft 19 into pin chamber 3, torsional stress will be placed on pin chamber 3, and that such stress will be borne by breakaway pin 15. Any torsional stress applied during the operation of connector 1 will also be borne by breakaway pin 15. In order that any such stresses do not cause deformation of breakaway pin 15, or in any way affect its yielding strength and thereby the load limiting capacity of connector 1, torsion pins 31 are inserted into holes 32 which extend through pin chamber 3 and into main body 4. To effectively "isolate" breakaway pin 15 from torsional stress, in the preferred embodiment at least two torsion pins 31 are used. However, it will be appreciated that more than two torsion pins could be utilized and that, while for ease of assembly torsion pins 31 are preferably cylindrical in shape, other torsion pin shapes and configurations could be used. Furthermore, torsion pins 31 are preferably press fitted into pin chamber 3 and main body 2, however, they could equally be threaded into place. In either case, with the utilization of torsion pins 31, pin chamber 3 is prevented from rotating within central bore 8.

As discussed, when assembled and subjected to tensile loading which exceeds the yielding point of breakaway pin 15, connector 1 will separate into 2 parts; one part comprising main body 2 and the other part comprising secondary body 4 threaded into pin chamber 3. To allow for smoother separation, a bushing 33 is placed between the side walls of pin chamber 3 and main body 2. While pin chamber 3 and main body 2 would typically be constructed of high strength steel, bushing 33 is preferably comprised of bronze, brass or a similar material to facilitate the separation of the parts when breakaway pin 15 fails. Bushing 33 is also constructed so as to provide for a press fit into central bore 8, while pin chamber 3 is only closely held within bushing 33. In this manner, when main body 2 separates from the remaining parts upon failure of breaking pin 15, bushing 33 remains in place within central bore 8.

Figure 6:
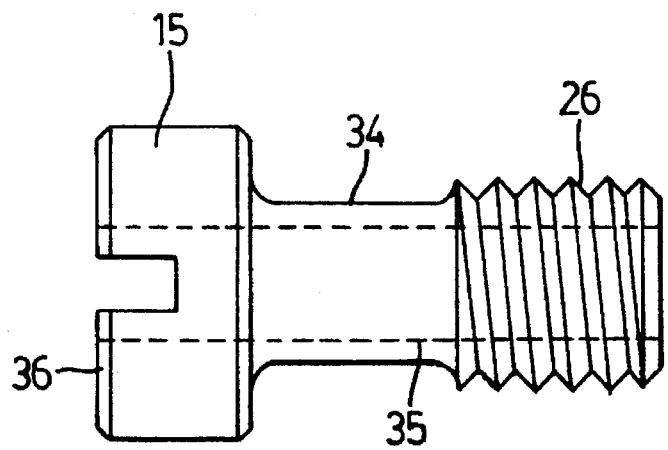

Referring now to FIG. 6, the structure of breakaway pin 15 is more clearly shown. Breakaway pin 15 is of a generally cylindrical shape with an enlarged head 36. Head 36 is of a sufficient size to prevent it from passing through pin passageway 14. Breakaway pin 15 also includes a reduced diameter portion 34 and a centrally located bore 35 that extends longitudinally through it. The combination of reduced diameter portion 34 and bore 35 provide a defined breaking area where pin 15 will fail when subjected to tensile loading beyond its yield point. Through the provision of a reduced diameter portion 34 and the inclusion of bore 35, breakaway pin 15 has been found to break more smoothly and distinctly without undergoing excessive elongation or necking.

Figure 5:
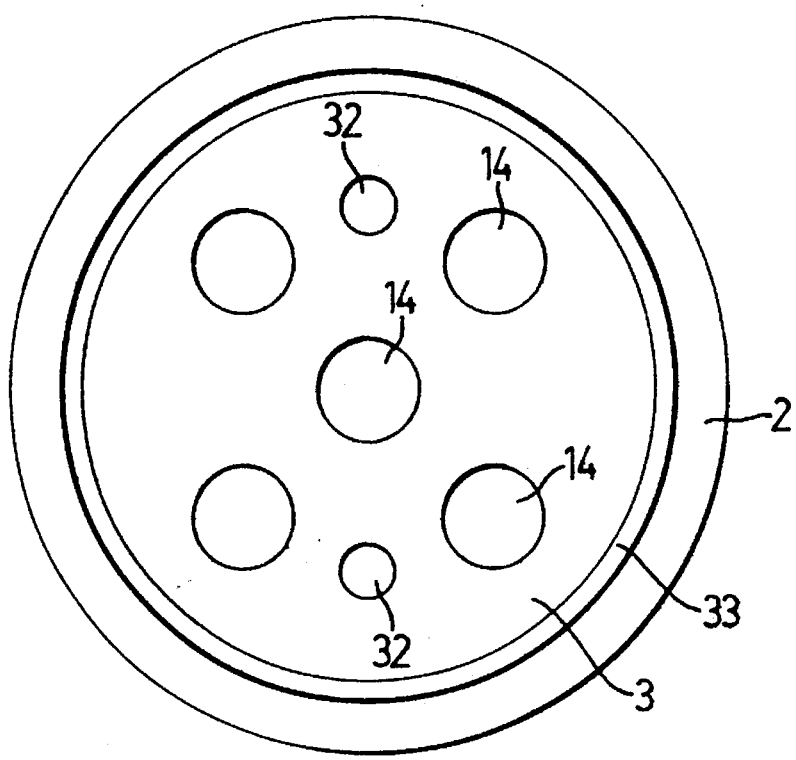
FIG. 5 is a sectional view of the present invention taken along the line 5—5 in FIG. 1; and, FIG. 6 is a side view of a typical breakaway pin according to the present invention.

As shown in FIG. 5, connector 1 preferably includes a plurality of pin passageways 14 such that multiple breakaway pins may be used. It has been found that through varying the material from which the pins are created, and from varying the diameter of bore 35, different yielding values for the pins may be achieved. It has also been found that the total breaking strength of connector 1 comprises the sum of the individual breaking strengths of all breakaway pins being used in a particular application. For example, if four breakaway pins, each having a breaking strength of 500 pounds, are used, connector 1 will separate at an approximate tensile load of 2000 pounds. Even more surprisingly, it has been found that mixing pins comprised of different materials has little effect on the predictability of the overall breaking load for the connector. That is, if two aluminum breakaway pins, each yielding at 750 pounds, are used together with one stainless steel pin which yields at 2000 pounds, the connector will separate at an approximate tensile load of 3500 pounds. Testing has shown that the accuracy of the predicability of the breaking strength for the connector in such circumstances high and well within accepted industry standards.

The number of breakaway pins that are used is limited primarily by the number that can practically be inserted physically within pin chamber 3. FIG. 5 shows the use of five pin passageways thereby providing a wide variety of different pin placements that, together with different pin compositions and bore diameters, create an almost unlimited number of potential breaking strengths for connector 1. It will be appreciated, however, that in order to ensure uniform loading, breakaway pins 15 must be positioned in pin passageways 14 such that they are symmetrically loaded when connector 1 is subjected to tensile loading. For example, if a single breakaway pin is to be used it should be positioned in the middle pin passageway. Without uniform loading through the symmetrical positioning of breakaway pins 15, some of the breakaway pins may be subjected to greater tensile stress than others and the operation of connector 1 could be affected.

Based upon the foregoing, it will be understood by those familiar with the art that when used in a directional drilling or similar application, connector 1 will provide a means for disengaging a trailing cable or duct when the pulling force exceeds an approximate predetermined tensile load. In application, the maximum safe tensile load that may be applied to a cable or duct is specified by the manufacturer. Prior to pulling the cable or duct, connector 1 is assembled using breakaway pin compositions and configurations such that the load at which connector 1 will fail and separate is not greater than the allowable tensile load to which the cable or duct may be subjected. Built in safety factors in the allowable loading for the cable or duct compensate for any slight discrepancies that may occur in the actual yielding point of the connector. If for some reason the applied load were to exceed the predetermined approximate breaking value, the breakaway pins 15 would break causing connector 1 to separate thereby preventing structural damage to the cable or duct. At that point the cable or duct may be removed from the hole and the broken breakaway pins replaced so that connector 1 can be re-used for a subsequent pull.

It is to be understood that what has been described are the preferred embodiments of the invention and that it is possible to make variations to these embodiments while staying within the broad scope of the invention. Some of these variations have been discussed while others will be readily apparent to those skilled in the art to which the invention relates. For example, while reference has been made to the use of a clevis on the end of secondary body 4 and a lug on the end of main body 2, a variety of other attachment means could equally be used. In addition, while FIG. 5 shows the use of five pin passageways, fewer or more than five pin passageways could be used. Further, it will be appreciated that while pin chamber 3 is shown as being circular in shape, its function is not limited to that particular shape.

We claim:

1. A load limited connector, calibrated to fail at a predetermined approximate tensile load, the connector comprising:

a main body having first and second ends, said first end including first attachment means and said second end including a central bore;

a pin chamber constructed to be received in said central bore of said main body, said pin chamber having a central bore extending partially therethrough and at least one passageway therethrough which aligns with at least one longitudinal passageway in said main body, said passageway in said pin chamber and said longitudinal passageway in said main body together forming a pin passageway for receiving a breakaway pin;

a secondary body having first and second ends, said first end of said secondary body including second attachment means and said second end of said secondary body defining a shaft, said shaft being releasably secured within said central bore of said pin chamber;

at least one breakaway pin, said breakaway pin received within said pin passageway, said breakaway pin securing said pin chamber within said central bore of said main body and being calibrated to break at a predetermined approximate tensile load causing said load limited connector to axially separate into two separate components through said main body separating from said secondary body when said connector is subjected to tensile loading that exceeds said predetermined approximate tensile load; and at least one torsion pin extending through said pin chamber into said main body, parallel to said breakaway pin, thereby preventing rotation of said pin chamber within said main body.

2. The connector as claimed in claim 1 wherein said longitudinal passageway in said main body is threaded and said breakaway pin is correspondingly threaded such that said breakaway pin may be screwed into said main body to secure said pin chamber within said central bore of said main body.

3. The connector as claimed in claim 2 wherein said shaft on said secondary body is releasably secured within said central bore of said pin chamber by threading said shaft into said central bore of said pin chamber.

4. The connector as claimed in claim 3 including a bushing, said bushing situated within said central bore of said main body between said main body and said pin chamber, said bushing constructed to provide a press fit into said central bore of said main body and said pin chamber constructed to closely fit within said bushing.

5. The connector as claimed in claim 4 wherein said bushing facilitates the separation of said main body from said secondary body, upon the breakage of said breakaway pin, through reducing the frictional contact between said main body and said pin chamber.

6. The connector as claimed in claim 5 wherein said breakaway pin has a reduced diameter portion providing a breaking point, said breakaway pin breaking at said breaking point when said connector is subjected to said predetermined approximate tensile load.

7. The connector as claimed in claim 6 wherein said breakaway pin has a centrally located bore therethrough.

8. The connector as claimed in claim 7 having a plurality of pin passageways, each pin passageway capable of receiving a breakaway pin.

9. The connector as claimed in claim 8 having a plurality of breakaway pins, said breakaway pins being positioned in said pin passageways such that said breakaway pins are symmetrically loaded when said connector is subjected to tensile loading.

10. The connector as claimed in claim 9 wherein said first attachment means on said main body is a lug.

11. The connector as claimed in claim 10 wherein said second attachment means on said secondary body is a clevis.

12. A kit comprising:
    a load limited connector calibrated to fail at a predetermined approximate tensile load, the connector including a main body having first and second ends, said first end including first attachment means and said second end including a central bore; a pin chamber constructed to be received in said central bore of said main body, said pin chamber having a central bore extending partially therethrough and at least one passageway therethrough which aligns with at least one longitudinal passageway in said main body when said pin chamber is received in said central bore of said main body, said passageway in said pin chamber and said longitudinal passageway in said main body together forming a pin passageway for receiving a breakaway pin;

a secondary body having first and second ends, said first end of said secondary body including second attachment means and said second end of said secondary body defining a shaft, said shaft being releasably secured within said central bore of said pin chamber;

a plurality of breakaway pins, each being receivable within said pin passageways, said breakaway pins when received in said pin passageways securing said pin chamber within said central bore of said main body and being calibrated to break at a predetermined approximate tensile load, thereby causing said main body to separate from said secondary body when said connector is subjected to tensile loading that exceeds said predetermined approximate tensile load; and a plurality of torsion pins, said torsion pins being receivable through said pin chamber into said main body, parallel to said breakaway pins, and thereby preventing rotation of said pin chamber within said main body.

13. The kit as claimed in claim 12 including a plurality of bushings, said bushings being receivable within said central bore of said main body between said main body and said pin chamber, said bushings when received within said central bore of said main body facilitating in the separation of said main body from said secondary body upon the breakage of said breakaway pins.

* * * * *